United States Patent
Richter

[15] 3,673,116
[45] June 27, 1972

[54] RANEY MIXED CATALYST
[72] Inventor: Gerhard Richter, Erlangen, Germany
[73] Assignee: Siemens Aktiengesellschaft, Berlin, Germany
[22] Filed: May 11, 1970
[21] Appl. No.: 36,402

[30] Foreign Application Priority Data
June 7, 1969 Germany.....................P 19 28 929.3

[52] U.S. Cl...........................252/466 T, 252/477 Q, 75/170
[51] Int. Cl. .......................................................B01j 11/22
[58] Field of Search........................252/477 Q, 466 J, 466 B; 75/170

[56] References Cited
UNITED STATES PATENTS
2,593,250   4/1952   Black et al. ........................252/477 Q Primary Examiner—Daniel E. Wyman
Assistant Examiner—W. J. Shine
Attorney—Curt M. Avery, Arthur E. Wilfond, Herbert L. Lerner and Daniel J. Tick

[57] ABSTRACT

A Raney mixed catalyst for use as a fuel cell electrode. The catalyst contains nickel, iron and one of the metals titanium or zirconium. The catalyst is prepared from a Raney alloy, which contains aluminum as the inactive component. The alloy is in at least one or two homogeneous quaternary phases.

21 Claims, No Drawings

RANEY MIXED CATALYST

It is known to use Raney nickel catalysts for accelerating electrochemical reactions in fuel cells and electrolysts as well as for hydrogenation reactions.

German Pat. No. 1,270,145 teaches increasing the activity of Raney nickel by alloying in another catalytically active metal, such as zirconium and titanium. The catalysts with two active metals, thus produced, are called Raney mixed catalysts. When such Raney catalysts of two catalytically active metals are used as electrode material in fuel elements, it is seen that they do not fully satisfy to their loading capacity and their behavior during continuous operation. The output efficiency of fuel cells must be considerably increased for economical as well as for technical reasons. To this end, it is necessary to improve the loading (charging) capacity of catalysts employed in fuel cells, particularly in catalysts consisting of non-noble metals.

It is an object of my invention to provide a Raney mixed catalyst with increased activity and improved stability.

The new Raney mixed catalyst comprises nickel, iron and one of the metals titanium or zirconium and is prepared from a Raney alloy, which contains aluminum as the inactive component and which is completely or partially in one or two homogeneous phases.

The fact that by alloying in an additional metallic component, the quality of a Raney mixed catalyst is so improved is surprising and could not have been predicted. When nickel-aluminum alloys are compounded with another catalytically active metal, the latter is usually not uniformly distributed in the resulting alloy. Usually, several phases of variable composition, result therefrom. Thus, for example, a Raney allow consisting of nickel-aluminum and chromium, contains several phases which either comprise nickel and aluminum or chromium and aluminum. If the aluminum is dissolved from the obtained binary phases, by means of an aqueous potassium-hydroxide solution, the result is a mixture of Raney nickel and Raney chromium, whose activity depends from the activity of both Raney metals. Since the Raney chromium has no appreciable activity, the thus produced mixture of Raney catalysts is less active than an equivalent amount of Raney nickel.

Examples of Raney alloys containing ternary homogeneous phases are nickel-iron-aluminum and nickel-molybdenum-aluminum. Raney mixed catalysts produced from such alloys are more active than Raney nickel, Raney iron or Raney molybdenum. Adding molybdenum or iron respectively to the nickel-iron-aluminum or to a nickel-molybdenum-aluminum alloy does not, however, further increase the activity of thus produced catalysts.

My invention teaches that improved Raney mixed catalyst can possibly be obtained by alloying a third catalytically active metal, when the selected third metal form a homogeneous, quaternary phase with the inactive component and with the other two active components.

During the fusion of the original components, homogeneous quaternary phases frequently occur in a mixture with other binary and ternary phases, which lead to Raney catalysts of variable activity. The activity of a catalyst, produced from many phases is therefore below the activity of the catalyst from the optimum phase. For this reason, the aim is to produce catalysts from such Raney alloys, which consists completely or overwhelmingly only of one phase containing all alloying components at an optimum ratio. The production of such Raney alloys comprising only one phase is very difficult, however, in 3 or 4 component systems. The type and volume composition of the occurring phases is very strongly influenced by the conditions prevailing during the cooling of the melts. Because of this, the activity of Raney mixed catalysts produced of such alloys is hard to reproduce. Moreover, alloys which were too quickly cooled from the melt, tend to corrode when stored in the air for long periods. This results in fine grains which have only a slight activity, after the inactive component has been separated.

The homogeneous titanium containing quaternary phase of Raney alloy according to my invention, is composed of:

| a) | 67 – 70% | Aluminum |
|---|---|---|
| | 13 – 23% | Nickel |
| | 8 – 18% | Iron |
| | 0.3 – 1% | Titanium |
| b) | 58 – 60% | Aluminum |
| | 33 – 39% | Nickel |
| | 2 – 6% | Iron |
| | 0.4 – 1.2% | Titanium or |
| c) | 36 – 40% | Aluminum |
| | 43 – 56% | Nickel |
| | 6 – 16% | Iron |
| | 0.6 – 1.8% | Titanium | and the zirconium containing homogeneous quaternary phase is composed of:

| d) | 67 – 70% | Aluminum |
|---|---|---|
| | 12 – 23% | Nickel |
| | 8 – 18% | Iron |
| | 0.6 – 1.5% | Zirconium |
| e) | 58 – 60% | Aluminum |
| | 32 – 39% | Nickel |
| | 2 – 6% | Iron |
| | 0.8 – 2.0% | Zirconium or |
| f) | 36 – 40% | Aluminum |
| | 42 – 56% | Nickel |
| | 6 – 16% | Iron |
| | 1.2 – 3.0% | Zirconium |

The homogeneous four component phases of the Raney alloy of the compositions a, b, d and e do not occur immediately during the cooling process. The Raney alloys b and e, in order to obtain homogeneity, must be subjected to tempering process below 850° C, prior to the dissolution of the aluminum, while alloys a and e are tempered below 800° C. The duration of tempering to a great extent depends on the conditions during the preceding cooling from the melts. It was found beneficial to cool rapidly the Raney alloy produced by melting by excluding air, since the fine crystalline texture of the Raney alloy which occurs during the quenching of the melt, is easy to homogenize. Depending on the composition of the alloy and the cooling conditions, the required tempering process may be from one hour to 8 days.

The homogeneous phases of the Raney alloy indicated as a and b or d and e, form mixed phases which may also be used for producing the Raney mixed catalysts according to the invention. The mixed phases, just as the pure phases a, b, d and e, also result in catalysts whose activity is considerably greater than that of the Raney mixed catalyst produced of non-homogenized aluminum-nickel-iron alloys.

The homogeneous phases of the Raney alloys c and f occur immediately during the cooling from the melt, so that a tempering process is not required.

The aluminum is extracted from Raney alloys of a composition mentioned under a, b, d and e, in a known manner by means of aqueous metal hydroxide solution, for example KOH. In Raney alloys c and f, the aluminum may be extracted, but only incompletely, also with strong potash hydroxide solutions with heat. Thus, when these alloys are placed into cold 6n or 12n KOH, only a slight hydrogen development can be noted. Preferably, the aluminum is extracted by electrochemical means. For this purpose, the alloys, after pulverization, are placed between nickel meshes and used as an electrode wherein they are anodically charged in an alkali electrolyte, such as 12n KOH. The potential of the electrode, measured relative to a reversible hydrogen electrode in the same solution, is in excess of +200 mV. The potential is generally in the range of from 100 to 1,000 mV. If the extraction of the aluminum is to be effected prior to the installation of the catalyst into the electrode, then the aluminum can also be dissolved out in a way that the Raney alloys are suspended in the electrolyte and either an oxidation agent such as $H_2O_2$ added into the electrolyte solution or a gaseous oxidation agent such as air or oxygen is allowed to pass in form of drops through the electrolyte. The chemisorbed hydrogen may be removed by an appropriate dosing of the oxidation agent, so that at the end of the treatment process, the Raney mixed catalyst may be present in a "conserved" form and thus is no longer pyrophoric and is suitable for open air storage for long periods, without loss of activity.

Naturally, the oxidizing processing may also be effected in the customary manner in the case of Raney alloy (a, b, d and e) activated by KOH. The oxidation of the Raney mixed catalysts not only removes the pyrophoric properties, but as previously mentioned, simultaneously stabilizes the activity. Thus the Raney catalysts may be used also for very long operational periods without notable impairment of their activity, in electrodes of fuel elements or in electrolizers. During the "conserving" oxidation, the chemisorbed hydrogen is first oxidized and subsequently, the metal surface of the catalyst. Nickel and iron oxides, as well as titanium dioxide or zirconium dioxide, occur thereby. During the following reactivation of the catalyst with hydrogen or by means of cathodic prepolarization, only the nickel oxides, and possibly the iron oxides also, are reduced. The titanium dioxide as well as the zirconium dioxide are not reduced under these conditions.

Thus, titanium and zirconium may affect the Raney mixed catalysts in two ways. They are present in metallic form in the interior of the catalyst crystallites and influence the electron band structure of the catalyst and thus, its catalytic activity. In the surface layers of the crystallites, these components are present, following a preceding "conserving" process, as finely distributed oxide inclusions and contribute toward the production and stabilization of error locations and active centers.

Basically, titanium and zirconium may also be replaced by hafnium, niobium and tantalum. Due to their great atomic weight, these metals should be used in much higher amounts, approximately 15 and 20 percent. Because of financial practicalities, these metals should not achieve actual importance.

A disadvantage that is associated with aluminum deprived alloys, indicated under c and f, is in the obstruction of the aluminum dissolution. For some purposes this obstruction of aluminum extraction may actually constitute an advantage. When a Raney alloy composed of 50 percent nickel and 50 percent aluminum is installed into solid electrode structure, e.g. sintered electrodes or electrodes reinforced by binding agents, there is a danger that during the subsequent dissolution of the aluminum, the development of gas will become too intensive and that the electrode structure will become damaged. When the aluminum deprived alloys according to the invention are employed, such damages cannot occur.

The Raney alloys used for producing the Raney mixed catalysts, should consist of 80 percent of one or two homogeneous, quaternary phases.

The Raney mixed catalysts according to the invention consist, depending on the homogeneous phase of the Raney alloys used in their production, of:

a')  38 – 75%  Nickel
     24 – 59%  Iron, preferably 24 – 34%
     1 – 3%    Titanium b')  83 – 94%  Nickel
     5 – 14%   Iron
     1 – 3%    Titanium or c')  72 – 89%  Nickel
     10 – 25%  Iron
     1 – 3%    Titanium, or respectively d')  36 – 75%  Nickel
     24 – 59%  Iron, preferably 25 to 34%
     2 – 5%    Zirconium e')  81 – 93%  Nickel
     5 – 14%   Iron
     2 – 5%    Zirconium, or f')  70 – 88%  Nickel
     10 – 25%  Iron
     2 – 5%    Zirconium The activity of the Raney mixed catalysts according to the invention was measured by determining the specific exchange current. The active catalyst powder, suspended in water, is allowed to deposit on an electrode of gold or platinum, which is located on the bottom of a container. If this catalyst, which is maintained potentiostatically at a potential in the vicinity of the hydrogen potential, is suddenly forced into a potential jump for, for example 10 mV, the flow current is determined through the oxidation of a portion of the chemisorbed hydrogen. The current drops with the continued reaction of the oxidizing hydrogen. If this current is now extrapolated back to the point of time of the potential jump, the current obtained is just suitable to flow continuously if the consumed hydrogen may be replaced fast enough by a renewed supply. The exchange current is in proportion to the initial current. It corresponds to the initial current at a voltage jump of about 25 mV. The initial current which refers to a weight unit, is called specific exchange current and defines a measure for the activity of the catalyst. For pure Raney nickel, this specific exchange current lies below 1 A/g, at room temperature. By comparison exchange currents between 5 and 8 A/g are obtained with the Raney mixed catalysts, according to the invention.

The Raney mixed catalysts according to the invention are suitable for the production of pulverulent electrodes, if necessary reinforced by binders, as well as for producing sintered electrodes for use in fuel elements and electrolyzers. These can be employed in fuel elements, for oxidizing the hydrogen and organic fuels such as methanol, formaldehyde, formic acid, glycol, etc., as cathodes in electrolytic process, they considerably reduce the hydrogen overvoltage. The new Raney mixed catalysts may also be employed to accelerate hydrogenation reactions.

The object of the invention will be further illustrated in the following examples:

EXAMPLE 1

An alloy comprising 7 percent iron, 2 percent zirconium, 53 percent nickel and 38 percent aluminum was molten, cooled, crushed and a fraction of less than 50$\mu$ was screened out. 50 mg/cm$^2$ of the alloy was then placed, with the aid of nickel meshes, into an electrode holder, placed in 12n KOH and polarized against a reversible hydrogen electrode, in the same solution, for 10 hours at 80° C at a potential above +200 mV. When the electrode was operated in a half cell with a hydrogen pressure of 0.6 atmospheres gauge and a charge of 105 mA/cm$^2$, the polarization of the electrode was around 75 mV, at room temperature. The specific exchange current was 6.1 A/g.

An alloy of 7 percent iron, 55 percent nickel and 38 percent aluminum delivered under the same conditions, at 75 mV, only a current of 73 mA/cm$^2$ and a specific exchange current of 3.6 A/g.

EXAMPLE 2

An alloy of 8 percent iron, 22 percent nickel, 1 percent titanium and 69 percent aluminum were produced by quenching from the melt and homogenized by tempering at 800° C for 3 days. Following the homogenization, the alloy is broken up, screened and processed at room temperature with 6n KOH, whereby the aluminum dissolved out. The specific exchange current of the catalyst was 7.2 A/g.

A Raney catalyst produced in a conventional manner of an alloy of 8 percent iron, 23 percent nickel and 69 percent aluminum delivered, under similar conditions, only a specific exchange current of 1.7 A/g.

EXAMPLE 3

An alloy of 8 percent iron, 22 percent nickel, 1 percent zirconium and 69 percent aluminum was homogenized as in Example 2 and activated with KOH. The finished catalyst delivered a specific exchange current of 6.8 A/g.

EXAMPLE 4

100g of an alloy of 58 percent aluminum, 4 percent iron, 1 percent titanium and 37 percent nickel was molten, solidified by quenching and tempered at 850° C for 48 hours in a vacuum. The alloy was then broken up, screened and washed for 4 hours in 6n KOH at 80° C. The catalyst, thus produced, was then washed with distilled water, then dried under inert gas at 60° C. After being cooled, the alloy was oxidized, through careful dosing of air to the inert gas. The temperature, supervised with a thermoelement, may not exceed 100° C. The oxidation process was completed after 4 hours. Following reduction, this catalyst delivered a specific exchange current of 5.2 A/g.

A catalyst produced in the customary way of 58 percent aluminum, 4 percent iron and 38 percent nickel, delivers under the same conditions, a specific exchange current of 4.1 A/g.

EXAMPLE 5

An alloy of 14 percent iron, 1 percent titanium, 45 percent nickel and 40 percent aluminum was produced by sudden quenching from the melt. The regulus was broken up and screened. The washing in lye was effected at 60° C in 6n KOH for 12 hours under constant saturation with air. Thereafter, the catalyst was washed and dried. When as in Example 1, the catalyst was placed into an electrode, the latter delivered, following the reduction process, a current of 142 mA/cm$^2$, at an overvoltage of 120 mV.

A catalyst produced in the usual manner from an alloy of 14 percent iron, 46 percent nickel and 40 percent aluminum, delivers under the same conditions only a current of 82 mA/cm$^2$.

In the foregoing specifications and in the claims, all percentages are by weight.

We claim:

1. A Raney mixed catalyst comprising three active metals, said metals being nickel, iron and a third metal selected from titanium and zirconium, the iron content in said catalyst being 5 to 59 percent by weight, the titanium content when present being 1 to 3 percent by weight and the zirconium content, when present, being 2 to 5 percent by weight, said catalyst being prepared from a Raney alloy containing said three active metals and aluminum as an inactive metal, said alloy being at least partially in one or two homogeneous quaternary phases.

2. The Raney mixed catalyst of claim 1 comprising a homogeneous phase containing 38 to 75 percent nickel, 24 to 59 percent iron and 1.0 to 3.0 percent titanium.

3. The Raney mixed catalyst of claim 2 wherein the iron content is from 24 to 34 percent.

4. The Raney mixed catalyst of claim 1 comprising a homogeneous phase containing 83 to 94 percent nickel, 5 to 14 percent iron and 1 to 3 percent titanium.

5. The Raney mixed catalyst of claim 1 comprising a homogeneous phase containing 72 to 89 percent nickel, 10 to 25 percent iron and 1 to 3 percent titanium.

6. The Raney mixed catalyst of claim 1 comprising a homogeneous phase containing 36 to 74 percent nickel, 24 to 59 percent iron and 2 to 5 percent zirconium.

7. The Raney mixed catalyst of claim 6 wherein the iron content is 25 to 34 percent 8. The Raney mixed catalyst of claim 1 comprising a homogeneous phase containing 81 to 93 percent nickel, 5 to 14 percent iron and 2 to 5 percent zirconium.

9. The Raney mixed catalyst of claim 1 comprising a homogeneous phase containing 70 to 88 percent nickel, 10 to 25 percent iron and 2 to 5 percent zirconium.

10. The process for preparing a Raney mixed catalyst comprising three active metals, said metals being nickel, iron and a third metal selected from titanium and zirconium, which comprises forming a Raney alloy of aluminum, nickel, iron and titanium or zirconium which consists, at least 80 percent, of one or two homogeneous quaternary phases and dissolving out the aluminum from the alloy by a metal hydroxide solution.

11. The process of claim 10, wherein the Raney alloy ,before dissolving out the aluminum, is tempered at a temperature below 850° C.

12. The process of claim 10, wherein the Raney alloy is oxidized after the dissolution of aluminum.

13. The process of claim 12, wherein an electrochemical oxidation results from an anodic polarization over 100 to 1,000 mV measured against a reversible hydrogen electrode in the same solution.

14. The process of claim 12, wherein the oxidation means is selected from air, oxygen or hydrogen peroxide.

15. The process of claim 10, wherein the Raney alloy consists at least 80 percent of a homogeneous quaternary phase containing 67 to 70 percent aluminum, 13 to 23 percent nickel, 8.0 to 18 percent iron and 0.3 to 1 percent titanium.

16. The process of claim 10 wherein the Raney alloy consists at least 80 percent of a homogeneous quaternary phase containing 58 to 60 percent aluminum, 33 to 39 percent nickel, 2 to 6 percent iron and 0.4 to 1.2 percent titanium.

17. The process of claim 10, wherein the Raney alloy consists at least 80 percent of a homogeneous quaternary phase containing 36 to 40 percent aluminum, 43 to 56 percent nickel, 6 to 16 percent iron and 0.6 to 1.8 percent titanium.

18. The process of claim 10, wherein the Raney alloy consists at least 80 percent of a homogeneous quaternary phase containing 67 to 70 percent aluminum, 12 to 23 percent nickel, 8 to 18 percent iron and 0.6 to 1.5 percent zirconium.

19. The process of claim 10, wherein the Raney alloy consists at least 80 percent of a homogeneous quaternary phase containing 58 to 60 percent aluminum, 32 to 39 percent nickel, 2 to 6 percent iron and 0.8 to 2 percent zirconium.

20. The process of claim 10, wherein the Raney alloy consists at least 80 percent of a homogeneous quaternary phase containing 36 to 40 percent aluminum, 42 to 56 percent nickel, 6 to 16 percent iron and 1.2 to 3 percent zirconium.

21. The method of claim 10, wherein the aluminum is dissolved out by anodic polarization.

* * * * *